US006694754B1

United States Patent
Schenk et al.

(10) Patent No.: US 6,694,754 B1
(45) Date of Patent: Feb. 24, 2004

(54) REFRIGERATION APPLIANCE WITH PULSED DEFROST HEATER

(75) Inventors: Dennis G. Schenk, Wadesville, IN (US); John R. Wisnoski, Haubstadt, IN (US); David A. Diekmann, Evansville, IN (US); Steven J. Kuehl, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/348,054

(22) Filed: Jan. 20, 2003

Related U.S. Application Data
(60) Provisional application No. 60/366,693, filed on Mar. 22, 2002.

(51) Int. Cl.[7] .............................................. F25D 21/06
(52) U.S. Cl. .............................. 62/156; 62/276; 62/234
(58) Field of Search .......................... 62/151, 153, 154, 62/155, 156, 276, 234

(56) References Cited

U.S. PATENT DOCUMENTS

| | | | | |
|---|---|---|---|---|
| 3,611,741 A | | 10/1971 | Linstromberg | 62/137 |
| 3,656,314 A | * | 4/1972 | Jung | 62/97 |
| 4,416,119 A | | 11/1983 | Wilson et al. | 62/149 |
| 4,424,683 A | | 1/1984 | Manson | 62/135 |
| 4,481,785 A | * | 11/1984 | Tershak et al. | 62/153 |
| 4,665,710 A | * | 5/1987 | Kyzer et al. | 62/155 |
| 4,689,965 A | | 9/1987 | Janke et al. | 62/155 |
| 5,255,530 A | | 10/1993 | Janke | 62/180 |
| 5,363,667 A | * | 11/1994 | Janke et al. | 62/131 |
| 5,469,715 A | | 11/1995 | Janke et al. | 62/155 |
| 5,666,816 A | * | 9/1997 | Jeong et al. | 62/154 |
| 5,765,388 A | * | 6/1998 | Jeon | 62/408 |
| 5,904,049 A | * | 5/1999 | Jaster et al. | 62/204 |
| 5,924,298 A | * | 7/1999 | Yoo | 62/153 |
| 6,032,471 A | * | 3/2000 | Choi | 62/153 |
| 6,058,724 A | * | 5/2000 | Park | 62/156 |
| 6,131,400 A | * | 10/2000 | Seok et al. | 62/154 |
| 6,138,460 A | * | 10/2000 | Lee | 62/89 |
| 6,138,461 A | * | 10/2000 | Park et al. | 62/126 |
| 6,185,948 B1 | | 2/2001 | Niki et al. | 62/199 |
| 6,523,358 B2 | * | 2/2003 | Collins | 62/156 |

FOREIGN PATENT DOCUMENTS

GB 2143015 A * 1/1985

* cited by examiner

Primary Examiner—William E. Tapolcai
Assistant Examiner—Mohammad M. Ali
(74) Attorney, Agent, or Firm—Robert O. Rice; Stephen Krefman; John F. Colligan

(57) ABSTRACT

A refrigeration appliance is provided having a first compartment to be cooled, at least one evaporator in heat transfer association with the first compartment, a defrost heater associated with the evaporator, a temperature sensor associated with the evaporator, and a control circuit. The control circuit is arranged to selectively energize the defrost heater during a defrost cycle, selectively deenergize the defrost heater during the defrost cycle, generate a timing signal while the defrost heater is deenergized during the defrost cycle, and the control circuit is arranged to receive an input from the temperature sensor, and an accumulation of time from the timing signal. A method of operating such a refrigeration appliance includes operating the evaporator to cool the first compartment, initiating the defrost cycle to defrost the evaporator, repeatedly energizing the defrost heater for a first time period and deenergizing the defrost heater for a second time period during the defrost cycle, and terminating the defrost cycle after said evaporator has reached a predetermined optimum temperature.

20 Claims, 9 Drawing Sheets

REFRIGERATION APPLIANCE WITH PULSED DEFROST HEATER

BACKGROUND OF THE INVENTION

This application is a non-provisional of provisional application No. 60/366,693, filed on Mar. 22, 2002.

The present invention relates to refrigeration apparatus and more particularly to a multi-compartment refrigerator appliance, a refrigeration apparatus with evaporator heater for defrosting the evaporator and/or an automatic ice maker.

Multi-compartment refrigerator appliances are known, and in particular, there are dual compartment domestic refrigerator/freezer appliances such as disclosed in U.S. Pat. No. 4,416,119 and 5,255,530.

In the '119 patent, separate evaporators are used for controlling the temperature of the separate compartments.

In the '530 patent, a single evaporator, condenser and compressor are utilized for cooling two different compartments to different temperature levels by controlling air flow between the compartments. A variable speed motor drives the compressor, a variable speed condenser fan moves air over the condenser and a variable speed evaporator fan circulates air over the evaporator and to the two different compartments one of which is a freezer compartment and one of which is a fresh food compartment. The temperature of the fresh food compartment is controlled by varying the speed of the evaporator fan and the temperature of the freezer compartment is controlled by varying the speed of the evaporator fan and compressor motor.

U.S. Pat. No. 5,555,736 discloses a two compartment refrigeration appliance in which the temperature in the freezer compartment is controlled by varying a speed of the compressor motor and evaporator fan in response to a generated error signed comprising the difference between a sensed temperature and a manually set desired temperature. The temperature of the fresh food compartment is controlled by varying a speed of the evaporator fan and by controlling the position of an openable damper between the fresh food compartment and the freezer compartment.

U.S. Pat. No. 6,185,948 discloses a two compartment refrigeration appliance in which the temperature in each compartment is controlled through the use of a separate evaporator and evaporator for dedicated to each compartment.

Controls for selectively defrosting an evaporator are known, for example, as disclosed in U.S. Pat. Nos. 4,689, 965 and 5,469,715.

In the '965 patent the evaporator heater is run continuously during a defrost cycle and the time required for defrosting is used to adjust a length of time for the next cooling cycle before a next defrost cycle is required.

In the '715 patent a defrost cycle controller is disclosed which utilizes a continuously operating evaporator heater during a defrosting cycle.

Ice maker controls and methods for operating ice makers are known, such as those disclosed in U.S. Pat. Nos. 3,611,741 and 4,424,683.

In the '741 patent an evaporator fan is operated continuously during ice making operation and the duration of the ice making operation is controlled by an ice maker thermostat switch 32.

In the '683 patent, a calculating means is used to calculate a time for effecting a freezing of water in the ice making device dependent upon sensed temperatures in the freezer compartment and a determination of whether an evaporator fan is operating. Depending on whether the evaporator fan is on or off and whether a sensed temperature is above or below a predetermined temperature, a different calculation is made for determining whether sufficient time has passed for ice formation.

SUMMARY OF THE INVENTION

The present invention, in various embodiments, can be practiced in a refrigeration appliance, such as one with a freezer compartment and a fresh food compartment, in some embodiments in a refrigeration appliance having an automatic maker present in a freezer compartment, and in some embodiments in a refrigeration appliance having a control for defrosting an evaporator.

In an embodiment of the invention an evaporator fan is used to supply air to two or more compartments of a refrigeration appliance. The temperature in each compartment may be separately controlled. The speed of the evaporator fan is controlled by the sensed need for cooling of each compartment.

The state of each compartment is determined and compared. The compartment with the greater need for cooling will control the fan speed. A sensor, such as a thermistor, is placed in each compartment to determine the actual temperature of the compartment. This temperature is compared to a set point of the compartment set by the user. The difference between the set point and the thermistor temperature is called the error condition for the compartment. The sensor is monitored for a period of time to determine a rate of change for the compartment temperature. The error condition and the rate of change are combined and are referred to as the state of the compartment.

In an embodiment of the invention, the refrigeration system includes a variable capacity compressor, a fixed speed alternating current condenser fan, a direct current variable speed evaporator fan and a variable position damper.

In an embodiment of the invention a refrigeration appliance is provided which has a first compartment to be cooled, at least one evaporator in heat transfer association with the first compartment, defrost heater associated with the evaporator, a temperature sensor associated with the evaporator and a control circuit. The control circuit is arranged to selectively energize the defrost heater during a defrost cycle, to generate a timing signal while the defrost heater is de-energized during the defrost cycle, and the control circuit is arranged to receive an input from the temperature sensor and an accumulation of time from he timing signal.

A defrost cycle can be performed by this refrigeration appliance in which the evaporator is operated to cool the first compartment, the defrost cycle is initiated to defrost the evaporator, the evaporator heater is energized to heat the evaporator, a temperature of the evaporator is monitored with the temperature sensor, the evaporator heater is de-energized once a cut-off temperature is sensed, a time is accumulated that the evaporator is de-energized and the evaporator is re-energized to heat the evaporator upon reaching a specified accumulated time. The temperature of the evaporator is monitored with the temperature sensor and if the temperature is below the cut-off temperature the above steps are repeated once the cut-off temperature is reached. If the temperature is at or above the cut-off temperature, the evaporator heater is continued to be energized until the evaporator temperature reaches a pre-determined optimum temperature and thereafter the defrost cycle is terminated.

The control circuit in this embodiment may operate to include a step of waiting for a drip time to pass before terminating the defrost cycle and the drip time may have a length dependent upon an accumulated total time that the evaporator heater has been energized. The control circuit might further include a delaying operation of an evaporator fan after termination of the defrost cycle until a sensed temperature of the evaporator has fallen below a predetermined cooling temperature.

In an embodiment of the invention, the control circuit repeatedly energizes and de-energizes the defrost heater during the defrost cycle and terminates the defrost cycle after the evaporator has reached a predetermined optimum temperature.

In an embodiment of the invention an ice maker is provided in a freezer compartment, the ice maker including a mold for receiving water in which to form ice bodies and an ice storage bin. The appliance also includes a fresh food compartment with the freezer compartment and the fresh food compartment cooled by means of an evaporator in thermal communication with both compartments and a fan to direct a stream of air over the evaporator and through both compartments. A method is provided in which a fill level of the ice storage bin is monitored, and when the ice level is below a desired "full" level, a charge of water is dispensed into the mold. An alternate cooling routine is initiated by energizing a motor of the evaporator fan for a sufficient period of time to freeze the water in the mold. During this time, the temperature in the fresh food compartment is monitored and controlled by selectively allowing and preventing the air stream from passing through the fresh food compartment. If desired, the temperature in the freezer compartment may be monitored and controlled by energizing and de-energizing the compressor, or the compressor may remain energized during the entire alternate cooling routine. The ice bodies are dispersed from the mold to the storage bin upon completion of the freezing time. If the storage bin is the "full", the alternate cooling routine is terminated. Otherwise a new charge of water is introduced to the mold and the process is repeated.

DETAILED DESCRIPTION OF THE PREFERRED EMBODIMENT

In an embodiment, the present invention includes a multi-compartment refrigerator control algorithm for a variable speed evaporator fan motor. This invention can be utilized in a refrigeration appliance having two or more refrigeration compartments with separate cooling requirements. Although the invention can be used in a variety of different types of refrigeration apparatus, the invention will be explained in the context of a two compartment refrigeration appliance, and in particular wherein one of the compartments is maintained below the freezing temperature of water and is referred to as a freezer compartment, while the other compartment is maintained at a temperature slightly above the freezing temperature of water and is referred to as a fresh food compartment. It is not necessary for the present invention that both compartments be maintained at different temperatures or that one or the other be maintained below the freezing temperature of water or above the freezing temperature of water.

Figure 1:
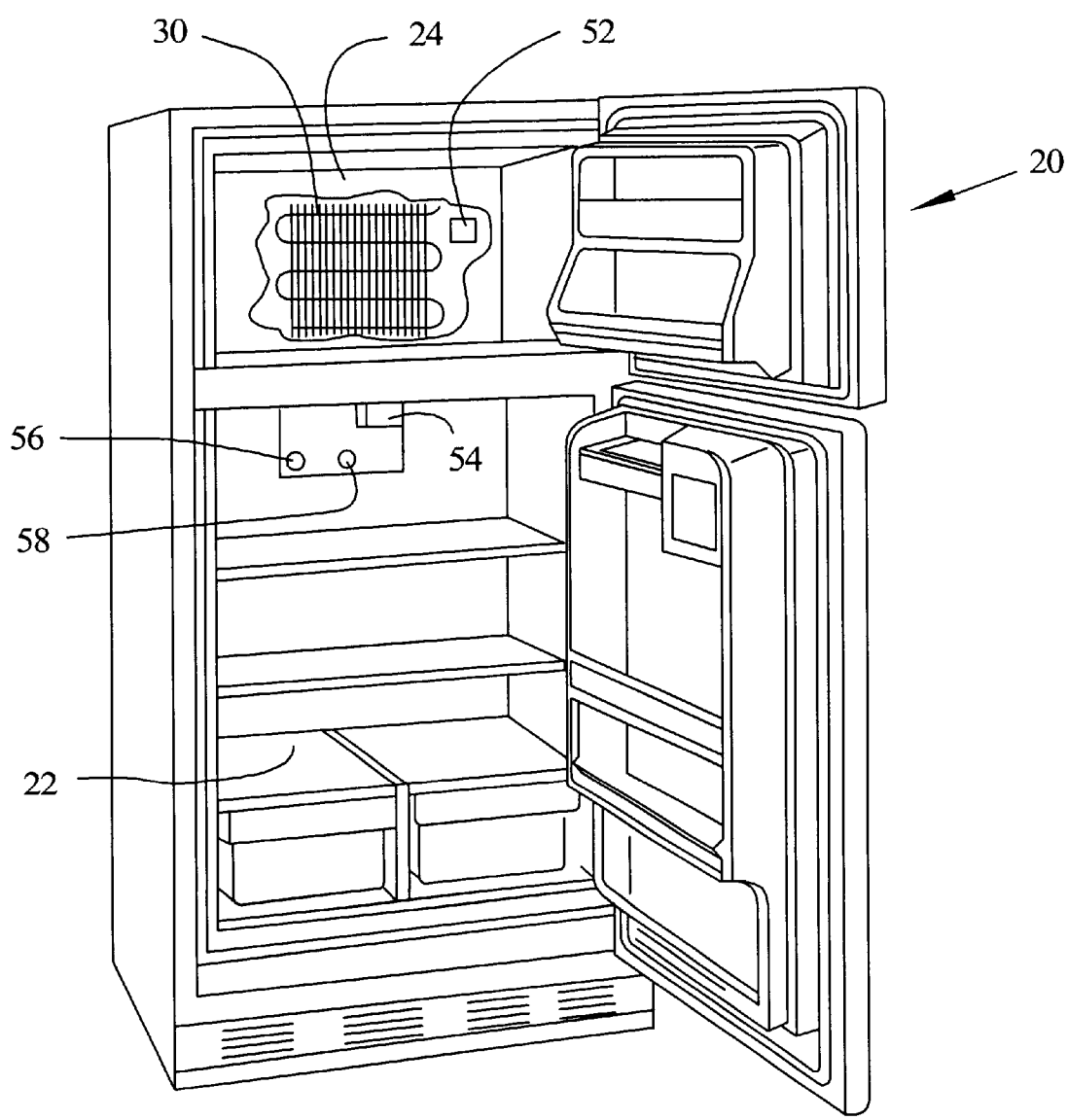
FIG. 1 is a perspective illustration of a two compartment refrigeration appliance.

In FIG. 1 there is illustrated an example of a two compartment refrigeration appliance generally at 20 having a first refrigeration compartment 22 which is to be maintained at a temperature above the freezing temperature of water, typically in the range of 35–40° F., and is referred to herein as a fresh food compartment. A second compartment 24 is illustrated in this figure as being positioned above the fresh food compartment 22 and, in this described embodiment, is to be maintained below the freezing temperature of water and is referred to as a freezer compartment. Other configurations of two compartment refrigeration appliances are known including those where the freezer compartment is located below the fresh food compartment and where the freezer compartment is located in a side-by-side arrangement with the fresh food compartment. The present invention can be used in all of these different configurations.

Figure 2:
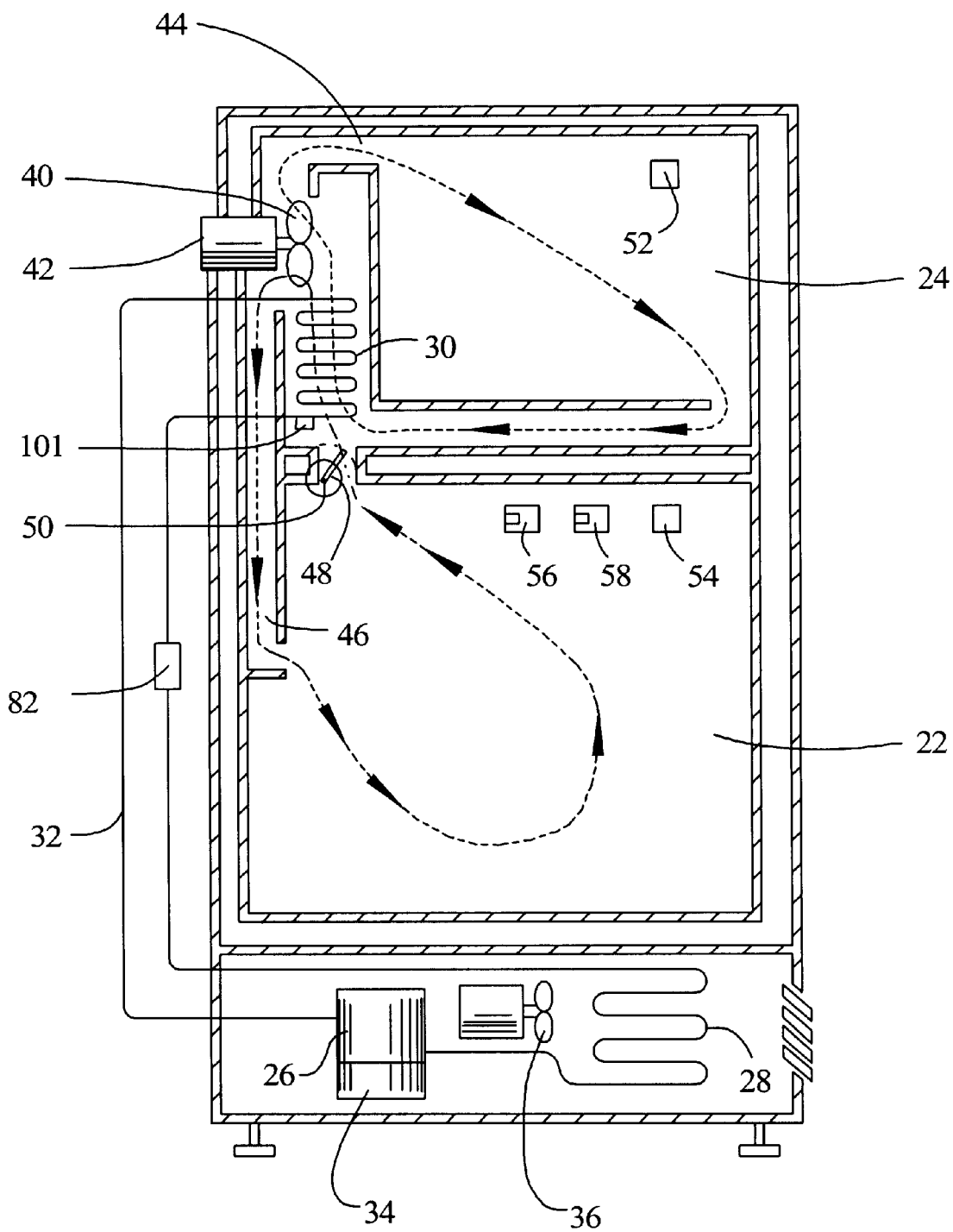
FIG. 2 is a schematic side sectional view of the refrigeration appliance of FIG. 1.

FIG. 2 illustrates, schematically, components of a refrigeration appliance which include a compressor 26, a condenser 28 and an evaporator 30 communicating with each other through a refrigeration conduit 32. A direct current variable speed compressor motor 34 is coupled to the compressor 26 and causes refrigerant to move through the refrigeration system conduit 32 as is well known.

A condenser fan 36 is driven by a condenser fan motor 38 to cool the condenser 28. An evaporator fan 40 is driven by an evaporator fan motor 42 to direct an air flow stream across the coils of the evaporator 30.

The evaporator fan 40 circulates a first stream of air 44 through the freezer compartment 24 and over the evaporator 30. The evaporator fan 40 also circulates a second stream of air 46 through the fresh food compartment 22 and over the evaporator 30. The second stream of air, however, is controlled by means of an air door 48 (which could be constructed in various ways, such as a linear air door) which is driven by an air door motor 50 between a fully closed position and a fully open position which may be through a 90° opening movement. When the air door 48 is in the closed position, the second stream of air 46 is prevented from flowing through the fresh food compartment 22. When the air door 48 is in the fully open position, the maximum second air stream 46 is permitted to flow through the fresh food compartment 22 and when the air door 48 is in a partially open position, a reduced second air stream 46 is permitted to flow through the fresh food compartment 22. The second air stream 46 may also pass through the freezer compartment 24 as it makes a circuit between the fresh food compartment 22 and the evaporator 30.

A first temperature sensor 52, which may be in the form of a thermistor, is situated in the freezer compartment 24 to sense the temperature within the freezer compartment. A second temperature sensor 54, which also may be in the form of a thermistor, is situated in the fresh food compartment 22 to sense the temperature within the fresh food compartment.

A first temperature control selector 56 may be provided for a user to select a desired temperature set point for the freezer compartment 24. A second temperature control selector 58 may be provided for the user to select a temperature set point for the fresh food compartment 22. In some appliances, one or both of the temperature control selectors 56, 58 may have preset and unalterable temperature set points.

Figure 4:
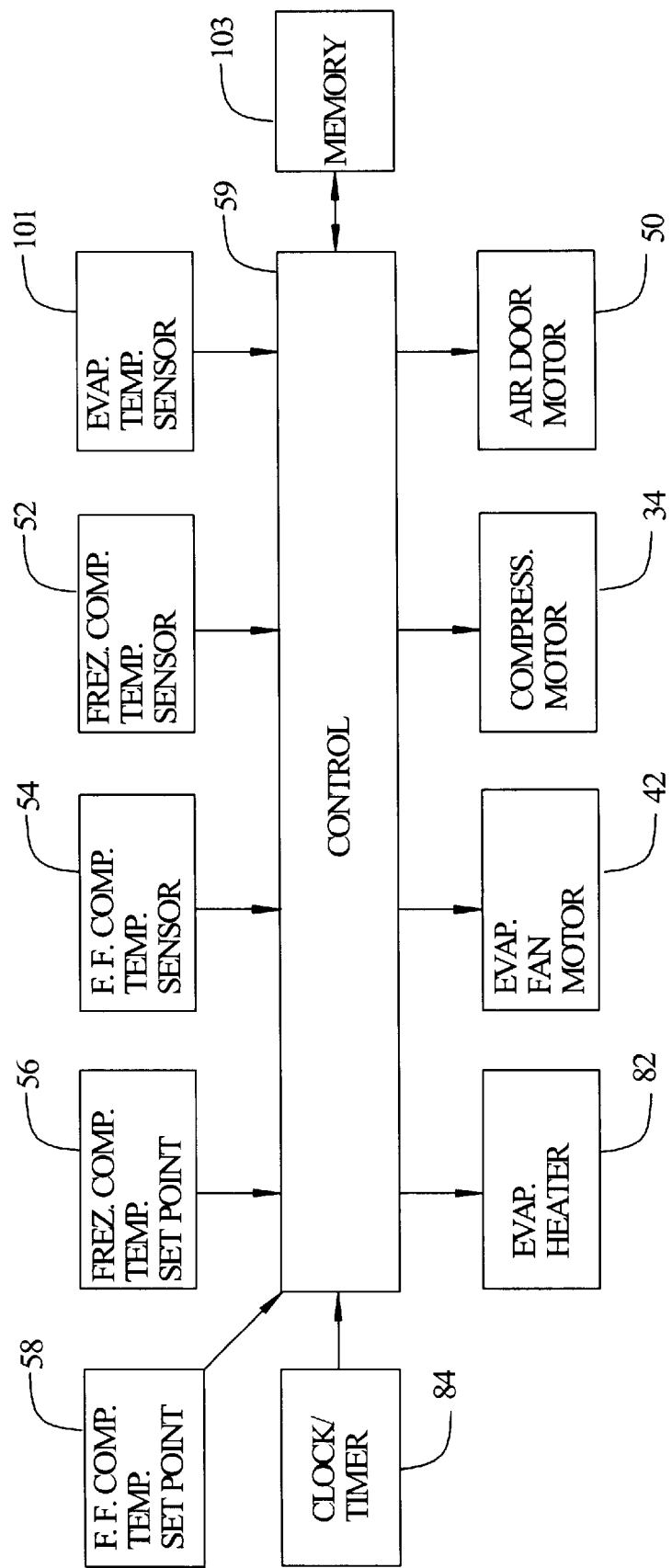
FIG. 4 is a schematic block diagram of a control system for the refrigeration appliance.

FIG. 4 schematically illustrates a control 59, which may include a microprocessor and associated circuitry. This control 59 receives inputs from the first temperature sensor 52, the second temperature sensor 54, the first temperature control selector 56, the second temperature control selector 58 and sends control signals out to the evaporator fan motor 42, the compressor motor 34 and the air door motor 50.

A refrigeration unit cooling routine shares cooling between the two compartments, in this embodiment comprising the freezer compartment 24 and the fresh food compartment 22. Management of the cooling routine is controlled by comparing the set point temperatures selected through the first and second temperature control selectors 56, 58 to actual thermistor sensed temperatures, with this comparison referenced as the temperature error value. If either thermistor drifts from the set point, the control 59 will adjust appropriate devices to maintain the user set point temperature in each compartment as described below.

Figure 3:
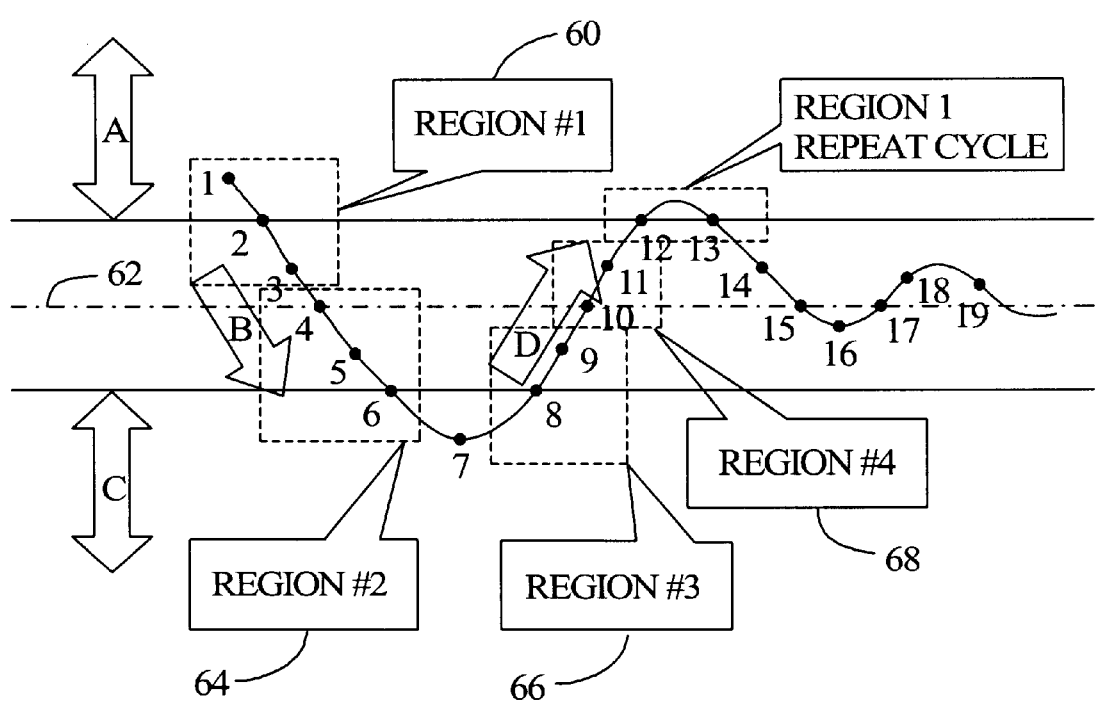
FIG. 3 is a graphic illustration of sensed temperature points in a fresh food compartment during cooling cycles.

Referencing FIG. 3, what is illustrated is a temperature versus time graph of sensed temperatures within the fresh food compartment. Operation of the refrigerator control will be described in connection with this graph.

In this graph, there is a box 60 labeled Region #1 which has several sensed temperature points located inside. Any time the fresh food temperature is greater than an adjusted user set point indicated by line 62, the evaporator fan 40 will be run at its maximum speed and the air door 48 will be fully open. However, in the event that the freezer compartment 24 and the fresh food compartment 22 both require cooling, the evaporator fan control algorithm will compare which compartment temperature is further from the temperature error value. The control will also compare temperature slopes (that is, rate of temperature change within the compartments) in order to quantify which compartment is in "greater violation" of not meeting the user's set point requirements. If the freezer compartment 24 has a greater slope from the user set point, stepping up the speed of the compressor 26 will be considered, but the speed of the evaporator fan 40 will continue to be maintained at maximum and the air door 48 maintained in a full open position.

Region #1 has points 2 and 3 located therein. At these points, which are above the user set point 62, but by an amount below some predetermined amount, the evaporator fan 40 will continue to be run at maximum speed and the air door 48 will continue to be fully open. In this embodiment, since the freezer compartment temperature is of concern only at an upper limit, that is, not to exceed the set point temperature, it is acceptable to cool the freezer compartment 24 below that set point by any amount necessary to achieve the fresh food user set point 62. If a lower temperature limit is of concern for the second compartment, that is, if this compartment is to be maintained above some predetermined temperature, as well as below the set point temperature, a separate air door can be utilized to keep the temperature in the second compartment from exceeding a lower limit. For example, if the second compartment is also a fresh food compartment which is to be maintained below some user set point temperature, yet to be maintained above freezing, a second air door could be utilized to prevent over cooling.

In a box 64 labeled Region #2, temperature points 4, 5 and 6 indicate that the fresh food compartment temperature is recovering and has overshot the user set point 62 in a negative direction. When in this region, a decision must be made as to which compartment has control over the evaporator fan speed. This decision will be based upon comparing the temperature error value of the fresh food compartment 22 and the freezer compartment 24. If the fresh food compartment temperature error value is greater than the freezer compartment temperature error value, the evaporator fan speed will be adjusted based upon a refrigerator compartment calculation. The air door 48 will remain in its full open position.

If the fresh food compartment temperature error value is less than the freezer compartment temperature error value, the evaporator fan speed will be adjusted based on a freezer compartment calculation and the air door 48 will be moved to a calculated (closed or partially closed) position.

As the fresh food temperature approaches the lower limit, or point 6, it is most likely that the freezer compartment temperature will control the evaporator fan speed and the air door 48 will be closing. At points 7 and 8, where the temperature of the fresh food compartment 22 is below the user set point 62 by more than a predetermined amount, the air door 48 will be closed.

At the beginning of a box 66 labeled Region #3, which includes points 8, 9 and 10, the freezer compartment temperature error value should control the evaporator fan speed and the air door 48 should be closed. The fresh food compartment temperature is only monitored at this point and the temperature will be able to drift up to the user set point 62.

In a box 68 labeled Region #4 which includes points 10, 11 and 12, the decision process will follow that of region #2. While in Region #4, the air door 48 will open fully and the evaporator fan speed may be controlled by the fresh food compartment temperature error value or by the freezer compartment temperature error value. If the fresh food temperature goes above point 12 (user set point 62 plus a predetermined amount), the evaporator fan speed will return to maximum and the air door 48 will be moved to its full open position. The above described sequences will repeat for remaining temperature cycles.

When the unit is operating in Regions #2 and #3 and below points 6 and 8, the evaporator fan speed is controlled by the freezer temperature compartment error value. When the unit is operating in Regions #3 and #4 above point 8, then the fan speed is dependent on the current position of the air door 48. If the air door 48 is not fully open, then the fan speed remains unchanged. If, however, the air door 48 is fully open, then the fan speed is controlled by the greater of the refrigeration compartment temperature error value and the freezer compartment temperature error value. When the freezer compartment controls the fan speed, the fan speed preferably is made dependent upon the speed of the compressor motor 34 such that the greater the compressor motor rpm, the greater the evaporator fan speed that will be selected.

In a preferred embodiment, the evaporator fan 40 is driven by a d.c. motor 42 that has the ability to vary its speed, for example between 2200 rpm and 3000 rpm. This range of speed is utilized to improve the quantity of air flow across the evaporator 30 and to save energy when full speed is not required.

The air door 48 is preferably arranged as a pivoting door driven by a d.c. operated stepper motor 50. The air door 48 preferably can swing between a fully closed position at 0° and a fully open position at 90° and may be stopped at a number of positions between fully open and fully closed. The air door 48, when open, allows air from the freezer compartment 24 to enter the fresh food compartment 22. Door position is dependent on which area of the cooling curve is currently active. While operating in Region #1, the air door position is fully open. While operating in Regions #1 and #2 above point 6, the air door position depends on the evaporator fan speed control. If the fresh food compartment 22 is requesting higher evaporator fan speed than the freezer compartment 24, then the air door does not move and remains fully opened. If, however, the freezer compartment is requesting higher evaporator fan speed, then the door is moved to a position dependent upon the temperature error and the rate of change in the fresh food compartment 22. While operating in Regions #2 and #3 below points 6 and 8, the air door 48 is moved to the fully closed position. While operating in Regions #3 and #4, above point 8, the air door 48 is moved to the fully open position.

In a preferred embodiment, the compressor 26 is a variable capacity compressor. This means that the compressor speed can be varied, such as from 1650 rpm to 4500 rpm. While the compressor is running, its speed can be updated periodically. The factors that contribute to compressor speed are the temperature difference and the temperature rate of change in the freezer compartment 24 (or the compartment having the lower set point temperature).

Thus, it is seen that this embodiment of the present invention provides a multi-compartment refrigeration appliance wherein each compartment is to be maintained at an independently selected temperature and which includes a temperature selection input device for each compartment, at least one compressor, at least one evaporator, at least one fan for creating an air flow over the evaporator, a temperature sensor located in each compartment and a control circuit. The control circuit is adapted to receive an input from the temperature selection input device for each compartment and a temperature signal for each temperature sensor and to produce an error condition signal with a magnitude dependent on a difference between the selected temperature and the sensed temperature for each compartment. The control circuit is then used to control a speed of the fan in response to a greater of the air condition signals. The control circuit may be further arranged to receive a rate of change signal relating to a temperature sensed by each temperature sensor in relation to the input from each compartment temperature selection input device and to combine the rate of change signal with the error condition signal to generate a state of each compartment signal, and to control the speed of the fan by a greater of the state of the compartment signals.

During the operation of the compressor 26, while air from the fresh food compartment 22 and/or the freezer compartment 24 is caused to flow over the evaporator 30, water vapor in the air condenses onto and freezes on the evaporator 30 as a layer of ice. Over time, this layer of ice will act as an insulator, reducing the transfer of thermal energy from the air stream to the evaporator 30. Therefore it is a known practice to periodically defrost the evaporator in a "no frost" refrigeration appliance. However, the initiation of a defrost cycle is the single most energy consuming demand of a "no frost" refrigeration appliance.

In an embodiment, which may utilize portions of the control system of FIG. 4, the present invention contemplates an arrangement to reduce the amount of energy consumed during a defrost cycle by utilizing a pulse defrost heater routine. This routine may be used in a multi-compartment refrigeration appliance, as well as in a single compartment appliance. It can also be used in a multi-compartment appliance where each compartment is cooled by a separate evaporator. The control 59 is utilized to selectively energize and de-energize an evaporator heater 82, which may be a reversing valve, as is known, the control receiving an input from at least one clock or timer 84 that provides timing pulses or a timing signal.

Figure 5:
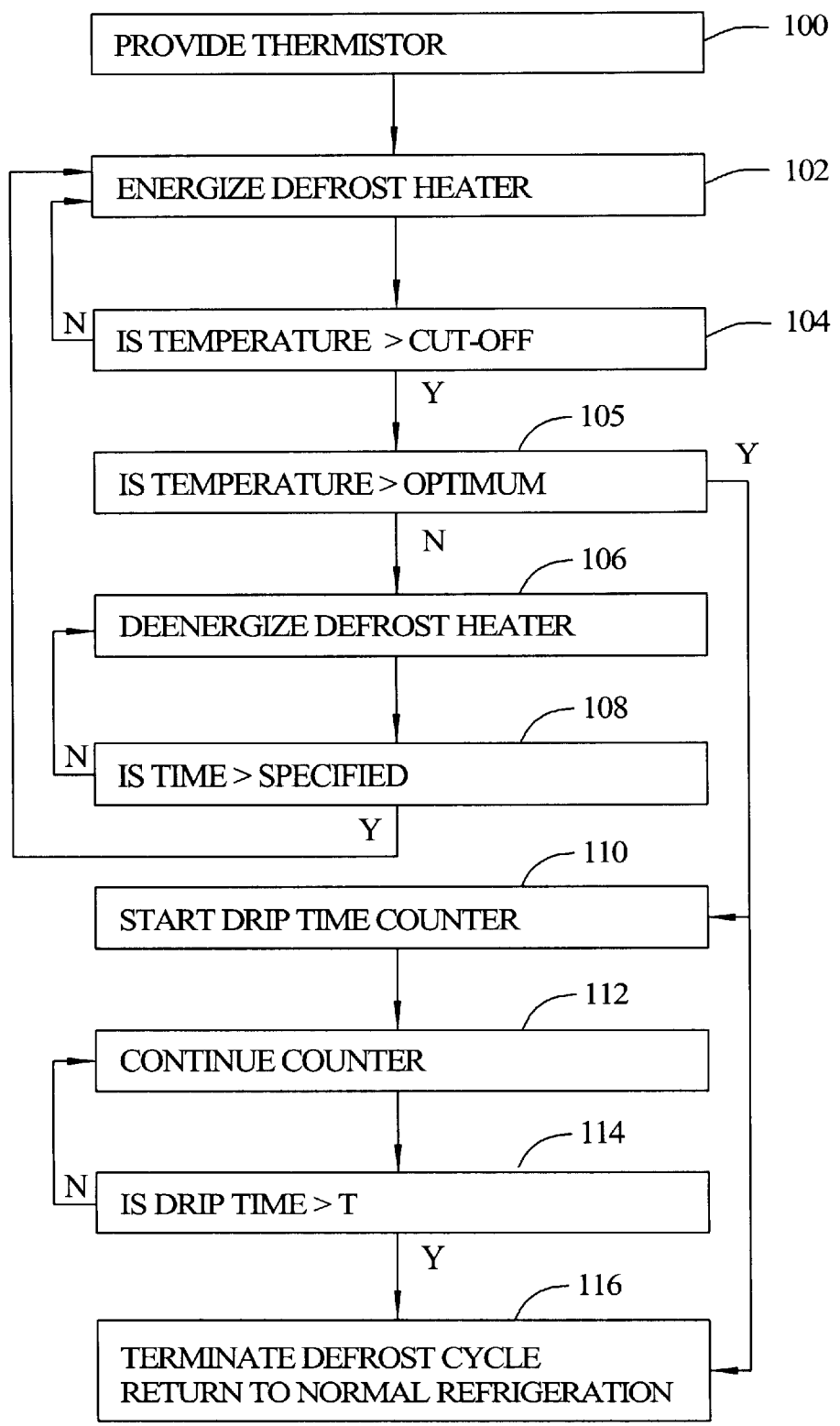
FIG. 5 is a flow chart diagram of a process for defrosting the evaporator.

A first method of pulsing the evaporator heater 82 is illustrated in the flow chart of FIG. 5. In this method, at a control unit 100, a temperature sensor 101, such as a thermistor, is provided directly on the evaporator 30. At a control unit 102, a defrost cycle is initiated by energizing the evaporator heater 82. At a control unit 104, a temperature of the evaporator 30 is sensed by the temperature sensor 101 and an inquiry is made by the control 59 as to whether the sensed temperature is greater than a predetermined cut-off temperature maintained as a parameter stored in a memory unit 103, which can be any type of memory unit, as is known. If the answer to the inquiry is no, control is returned back to the control unit 102.

If the sensed temperature is greater than the cut-off temperature, then control is passed to a control unit 105 to determine whether the sensed temperature is greater than a predetermined optimum temperature, also maintained as a stored parameter in the memory unit 103. If the answer to the inquiry is yes, the defrost cycle may be terminated as described below. If the answer to the inquiry is no, control is passed to a control unit 106 and the evaporator heater 82 is de-energized. Control passes to a control unit 108 in which input from the timer or clock 84 is used to accumulate the time since the evaporator heater 82 was first de-energized in the control unit 106. An inquiry is made as to whether the accumulated time is greater than a specified time maintained in the memory unit 103 as a stored parameter. If the specified time has not yet elapsed, control is passed back to the control unit 106, but if the specified time has elapsed, then control is passed to the control unit 102 for repeat of the cycle until the response at the control unit 105 is that the temperature is greater than the optimum temperature.

When the optimum temperature is reached, the defrost cycle may be terminated. However, in a preferred optional embodiment, first, control is passed to a control unit 110 for initiation of the use of the clock 84 to measure drip time. Control then passes to a control unit 112 for the clock 84 to count the time for dripping. Control then passes to a control unit 114 where an inquiry is made as to whether an accumulated drip time has exceeded a designated time maintained as a stored parameter in the memory unit 103. If the designated time has not been achieved, control is passed back to the control unit 112. If the designated time has been exceeded, then control is passed to a control unit 116 which terminates the defrost cycle and returns control to the normal refrigeration cycle. If the optional drip time delay is not utilized, control would pass directly from the control unit 105 to the control unit 116 as indicated.

The designated drip time reviewed in the control unit 114 can be a pre-selected length of time used for all defrost cycles, or can be a time which is dependent upon a length of the time that the evaporator heater 82 has been energized in the particular defrost cycle. In this latter case, in the control unit 102, when the evaporator heater 82 is energized, the clock 84 will also be used to accumulate time that the evaporator heater 82 is energized. When control passes to the control unit 106, the control 59 will stop accumulating time count, however, each time that control is passed back to the control unit 102, for a given defrost cycle, the control 59 will continue to accumulate the evaporator heater "on" time. In the control unit 114, the designated drip time can then be an amount of time calculated from an algebraic expression which includes the accumulated time that the evaporator heater 82 has been energized for a particular defrost cycle (such as a fixed amount of time greater than or equal to zero plus a particular fraction of the accumulated time), or can be a time value obtained, for example, from a look up table stored in the memory unit 103, in which the accumulated evaporator heater time is used for looking up an appropriate value for the designated drip time.

As part of the control unit 116, it may be desirable to include an optional "post-defrost" temperature based delay during initial start-up of the compressor 26, which can also employ the temperature sensor 101 used in step 100. In this optional step, operation of the evaporator fan 40 would be delayed until a predetermined temperature has been reached by the evaporator 30, in order to avoid fan heat and power loads and to avoid mixing of warm evaporator plenum air with freezer and fresh food compartment air until the evaporator temperature has dropped (for example, to at or below the compartment temperatures) to provide delivery of chilled air to the compartments. This delay will prevent the pumping of warm air into either of the compartments, or portions of the compartments, which might be detrimental to good food preservation practices.

Figure 6:
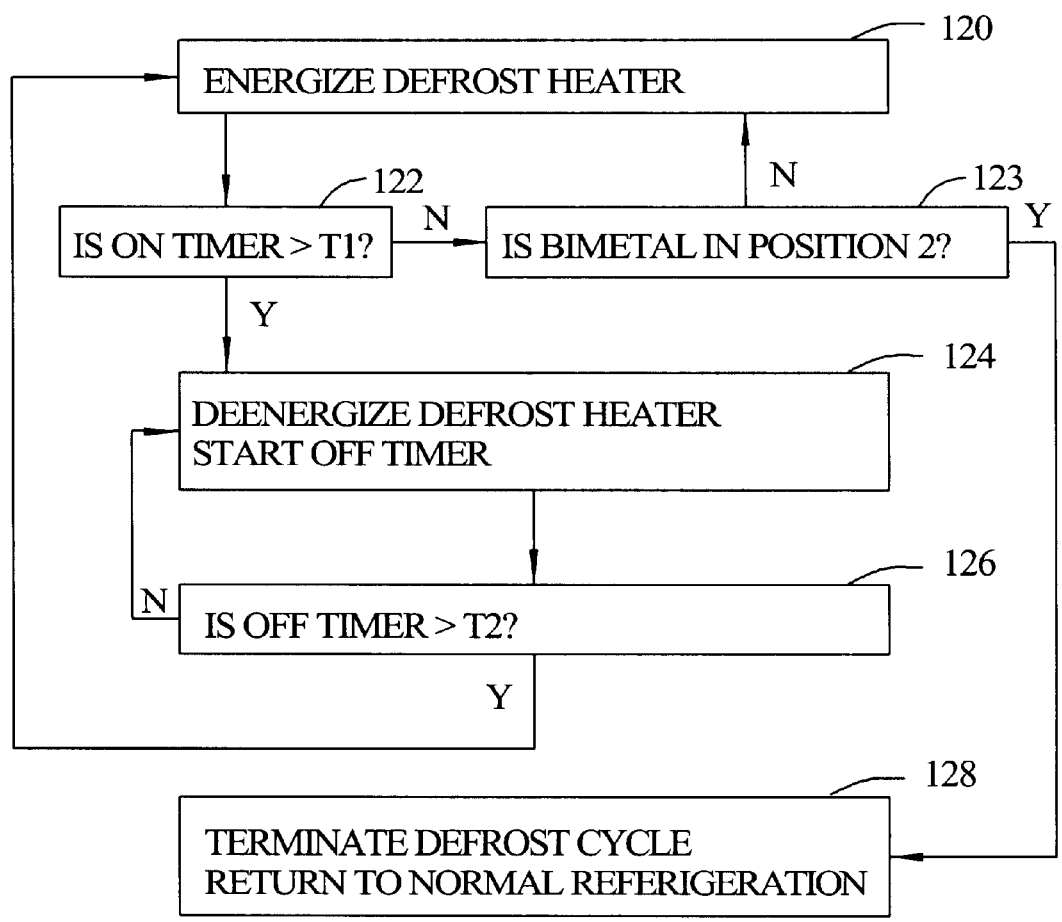
FIG. 6 is a flow chart diagram of a process for defrosting the evaporator.

A second approach to control the frequency of pulsing of the evaporator heater 82 is illustrated in the flow chart of FIG. 6. In this method, in a control unit 120, the evaporator heater 82 is energized and the clock 84 is used to accumulate time. Control then passes to a control unit 122 where an inquiry is made to determine whether the accumulated evaporator heater time exceeds a predetermined run time maintained as a stored parameter in the memory unit 103. If the predetermined run time has not been exceeded, then control is passed to a control unit 123 to check whether an optimum temperature of the evaporator 30 has been reached.

Figure 7:
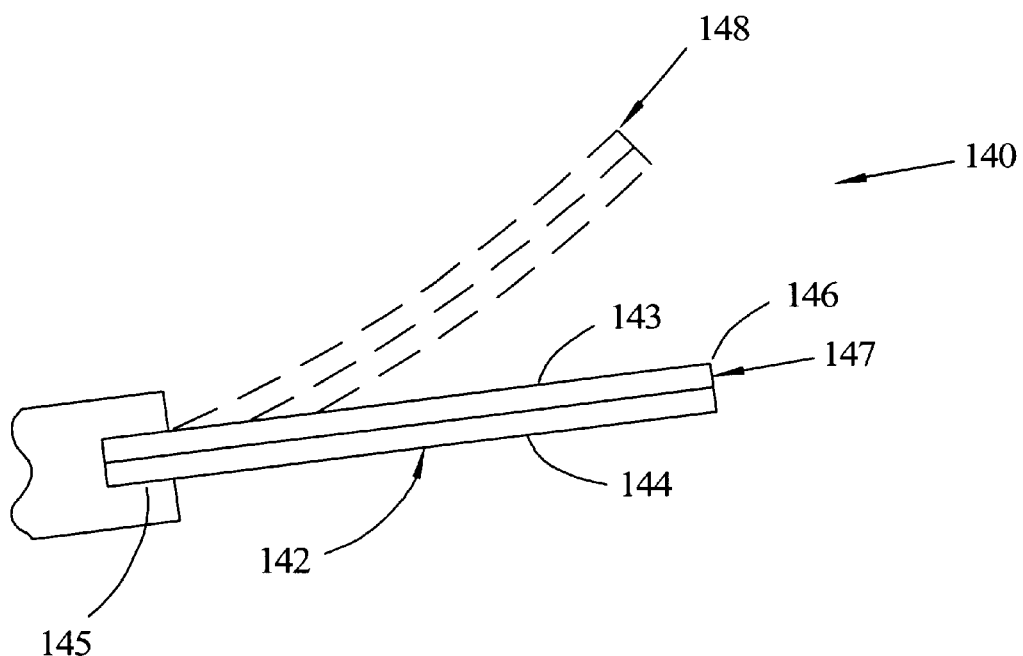
FIG. 7 is a schematic side view of a bi-metal temperature sensor.

In this embodiment, a temperature sensor in the form of a bi-metal device 140 is used to determine whether the optimum temperature has been reached. As shown in FIG. 7, this bi-metal device 140, which typically may include a finger 142 comprised of one metal 143 on a top surface and another metal 144 on a bottom surface, the two metals having differing expansion rates due to temperature changes.

In one arrangement, one end 145 of the bi-metal finger 142 can be fixed, for example in thermal communication with the evaporator 30, with an opposite end 146 free. As the temperature of the bi-metal finger changes, the finger will move up or down (in the orientation illustrated), depending on the temperature. If the initial temperature is below freezing, then the free end 146 of the finger 142 will be in an initial position 147. As the temperature of the evaporator 30 rises, the free end 146 of the finger 142 will move away from the initial position 147. When the free end 146 of the finger 142 arrives at a second position 148, which is a predetermined distance from the initial position 147, this will designate that the optimum temperature has been achieved by the evaporator 30, indicating that the defrosting of the evaporator is complete.

If the free end 146 has not moved to the second position 148, control is passed back to the control unit 120 for a repeat of the control loop. Once the designated run time has been exceeded, then control is passed to a control unit 124 in which the evaporator heater 82 is de-energized and an accumulation of heater "off" time is started. Control then passes to a control unit 126 where an inquiry is made to determine whether the off time has exceeded a second predetermined length of time maintained as a stored parameter in the memory unit 103. If not, control is passed back to the control unit 124 for further accumulation of off time. If the designated time has been exceeded, then control passes back to the control unit 120 where the evaporator heater 82 again is energized and a new run time begins to accumulate.

When the bi-metal device 140 queried in the control unit 123 moves a sufficient degree due to the achieved temperature reaching the stored optimum temperature, control then passes to a control unit 128 where the defrost cycle is terminated and control is returned to the normal refrigeration cycle. Again, as in the control unit 116 above, the control unit 128 may include the optional drip time routine and/or also the optional post-defrost temperature routine. In this case, the post-defrost temperature routine may depend on a further movement of the bi-metal device 140, such as back to the initial position 147.

Thus, it is seen that this embodiment of the present invention provides a method of operating a refrigeration appliance that has a compartment to be cooled and at least one evaporator in heat transfer association with the compartment, a defrost heater associated with the evaporator, a temperature sensor associated with the evaporator and a control circuit. The control circuit can be used to selectively energize the defrost cycle, to selectively de-energize the defrost heater during the defrost cycle and can be arranged to receive an input from the temperature sensor. The defrost cycle comprises the steps of operating the evaporator to cool the first compartment, initiating the defrost cycle to defrost the evaporator and repeatedly energizing the defrost heater for a first time period and de-energizing the defrost heater for a second time period during the defrost cycle, and terminating the defrost cycle after the evaporator has reached a predetermined optimum temperature. The first time period may be determined by monitoring the temperature of the evaporator and de-energizing the defrost heater when the sensed temperature reaches a predetermined cut-off temperature. Alternatively, the first time period could be determined by accumulating a time the evaporator heater has been energized since a last de-energization of the evaporator heater during the defrost cycle, and de-energizing the evaporator heater upon the accumulation of a predetermined designated time. The second time period can be determined by accumulating a time that the evaporator heater has been de-energized since a last energization of the evaporator heater during the defrost cycle and re-energizing the evaporator heater upon the accumulation of a predetermined specified time. The sensing of the evaporator temperature can occur through the use of a thermistor or by a bi-metal device or other temperature sensors.

Figure 8:
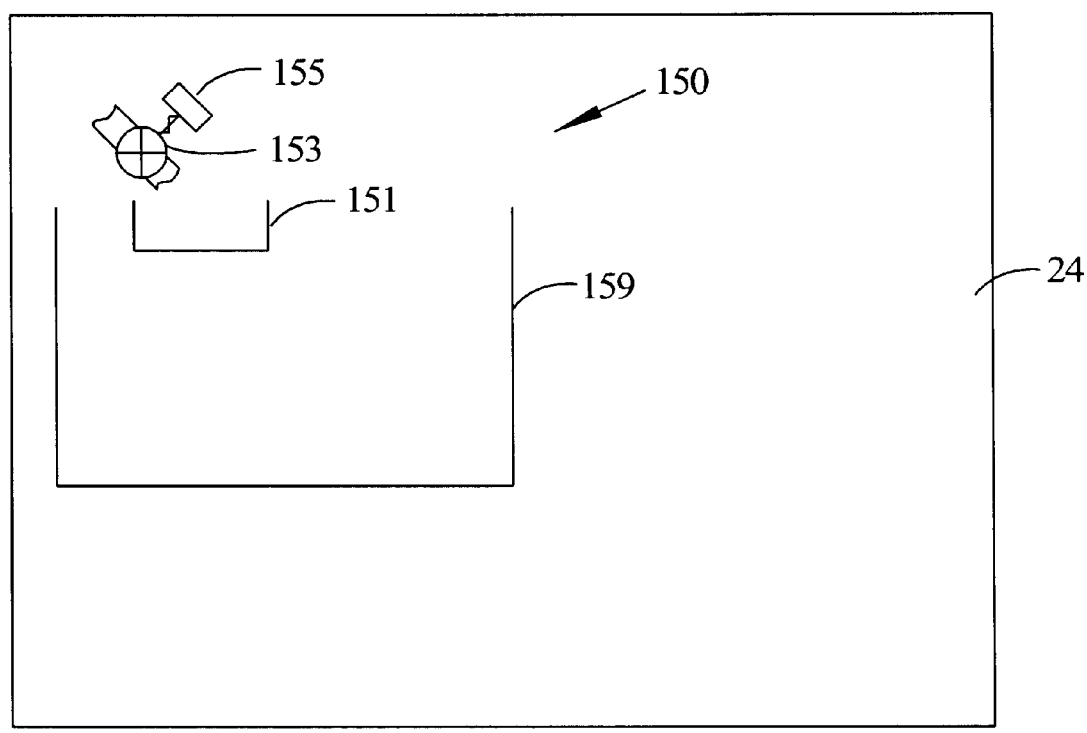
FIG. 8 is a schematic side view of an icemaker in the freezer compartment.

In the freezer compartment 24 it may be desirable, in an embodiment of the invention, to provide an automatic ice maker 150 (FIG. 8). In order to form ice bodies, water is periodically delivered into a tray or mold 151 through a water valve 153, such as by energizing a solenoid 155. In order to maximize the production of ice bodies, a special method is initiated when the water valve 153 is powered. This alternate cooling routine for the refrigeration appliance 20 will be maintained for a period of time after the water valve 153 is energized in that when the water valve is energized, water will be present in the ice maker 150.

Figure 9:
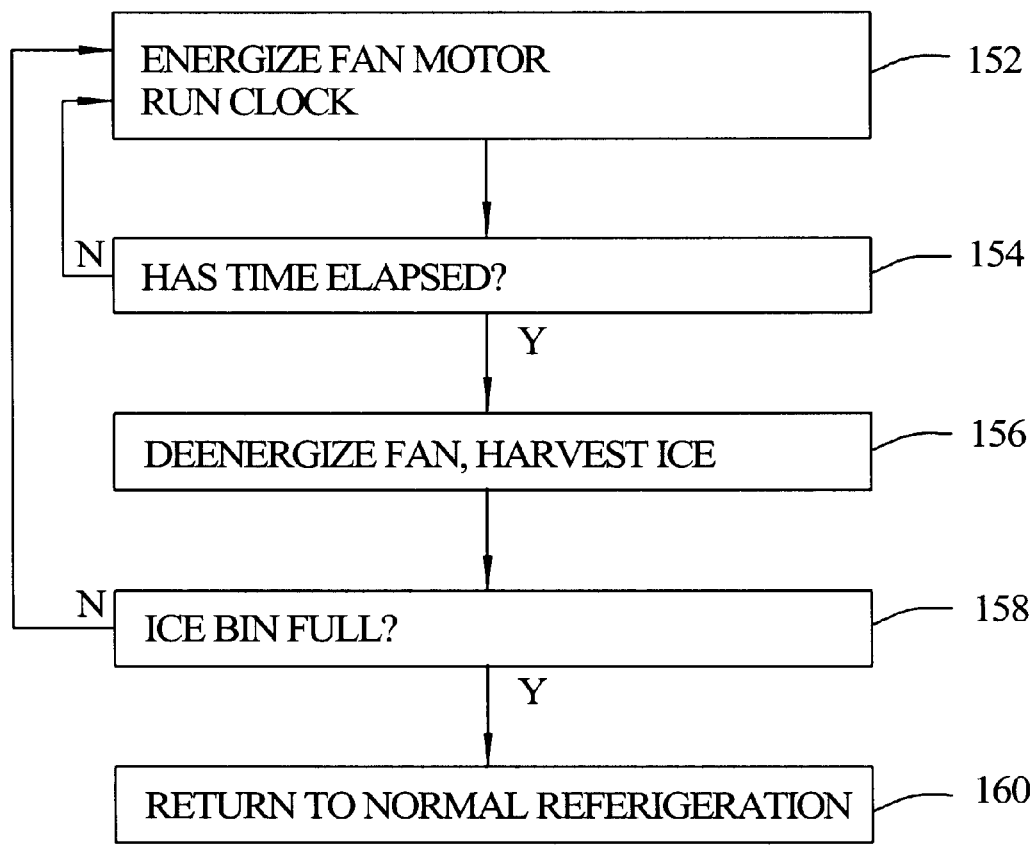
FIG. 9 is a flow chart diagram of a process for producing ice bodies in an ice maker.

As seen in FIG. 9, in this alternate cooling routine, control is passed to a control unit 152 to turn the evaporator fan motor 42 on and to initiate the clock 84. Control is then passed to a control unit 154 where an inquiry is made to determine whether the predetermined time required for freezing the water in the ice maker 150 has elapsed. This freezing time is maintained as a stored parameter in the memory unit 103. The freezing time can be an empirically determined length of time based on a selected freezer compartment temperature and a "worse case" inlet water temperature. This freezing time can be set at different levels depending on whether the evaporator is to be run continuously, as set forth below in some embodiments of the method, or if the evaporator is to be cycled on and off in response to demand by the freezer compartment temperature. Also, the freezing time can be set dependent on an operating speed of the evaporator motor, which may vary, as described, in some embodiments. If the freezing time has not elapsed, control is passed back to the control unit 152. If the freezing time has elapsed, then control is passed to a control unit 156 in which the evaporator fan motor 42 is de-energized and the ice bodies are harvested in accordance with known techniques. Control is then passed to a control unit 158 where it is determined whether an ice bin 159 is full. This can be done in a number of known ways including the use of sensors to determine the height of accumulated ice bodies in the ice bin, weight sensors, etc., such as disclosed in U.S. Pat. No. 4,424,683 incorporated herein by reference. If it is determined that the ice bin 159 is not full, control is then passed back to the control unit 152 to repeat the ice making cycle.

If it is determined by the control unit 158 that the ice bin 159 is full, then control passes to a control unit 160 to terminate the ice making cycle and control is returned back to the main control program for the refrigeration appliance 20.

During the ice making cooling routine it may be desirable to operate the compressor 26 continuously. This will decrease the length of time required to produce ice bodies, but it will also lower the temperature in the freezer compartment 24. If it is not desired to lower the temperature in the freezer compartment, then the compressor 26 can be cycled on and off in accordance with a demand for cooling initiated by the error condition signals described above, while leaving the evaporator fan motor 42 energized. Opening and closing the air door 48 as described above will control the temperature in the fresh food compartment 22.

If the compressor motor 34 has a variable speed, it can be set at its lowest value during the alternate ice body forming cooling routine to minimize energy consumption and to prevent the freezer compartment temperature from dropping too dramatically, or, if noise due to the continuous operation of the evaporator fan 40 is a consideration, then the compressor motor 34 can be run at its maximum speed to minimize the time that the alternate cooling routine is in effect.

Thus, it is seen that this embodiment of the present invention provides a method of maximizing ice production with an alternate cooling routine in a refrigeration appliance having a freezer compartment with a ice making device therein. The ice making device includes a mold for receiving water in which to form ice bodies and an ice storage bin. In this embodiment, a fresh food compartment and the freezer compartment are cooled by means of a refrigeration system including an evaporator and thermal communication with a freezer compartment and the fresh food compartment and an evaporator fan, driven by an evaporator fan motor, arranged to direct a stream of air over the evaporator and through the freezer compartment and ice making device and the fresh food compartment. This method includes the steps of monitoring a fill level of the ice storage bin and when it is detected that the fill level is below a predetermined "full" level, dispensing a charge of water into the mold. The alternate cooling routine is then initiated by energizing the evaporator fan for a sufficient period of time to freeze the water in the mold. Temperature in the fresh food compartment may be controlled by selectively allowing and preventing the air stream from passing through the fresh food compartment. It may be desired to control the temperature in the freezer compartment, and if so, this can be accomplished by energizing and de-energizing the compressor. Alternatively, the compressor can be maintained in an energize state during the entire alternate cooling routine. Upon the completion of the sufficient period of time, the ice bodies are dispensed from the mold to the storage bin and, if the storage bin is now full, the alternate cooling routine is terminated. If the contents of the bin remain below the "full" level, a new charge of water is dispensed into the mold and the alternate cooling routine is continued.

As is apparent from the foregoing specification, the invention is susceptible of being embodied with various alterations and modifications which may differ particularly from those that have been described in the preceding specification and description. For example, various components of the control circuitry illustrated in FIG. 4 may be used only for some of the embodiments described above, while not being necessary for other embodiments. Further, several of the embodiments can be used in combination in a single refrigeration appliance and each of the embodiments can be used in isolation. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A refrigeration appliance comprising
   a first compartment to be cooled,
   at least one evaporator in heat transfer association with said first compartment,
   a defrost heater associated with said evaporator,
   a temperature sensor associated with said evaporator,
   a timer for providing a timing signal,
   a control circuit arranged to
      communicate with said timer,
      repeatedly energize said defrost heater during a defrost, cycle,
      repeatedly deenergize said defrost heater during said defrost, cycle, and
   said control circuit arranged to receive
      an input from said temperature sensor,
      an accumulation of time from said timing signal while said defrost heater is deenergized during said defrost cycle.

2. A refrigeration appliance according to claim 1, wherein said control circuit further is arranged to generate a second timing signal while said defrost heater is energized during said defrost cycle and to receive an accumulation of time from said second timing signal.

3. A refrigeration appliance according to claim 2, wherein said control circuit is further arranged to determine a drip time having a length dependent upon said accumulation of time from said second timing signal.

4. A refrigeration appliance according to claim 1, wherein said temperature sensor comprises a thermistor.

5. A refrigeration appliance according to claim 1, wherein said sensor comprises a bimetal device.

6. A refrigeration appliance according to claim 1 wherein said appliance further includes a second compartment to be cooled, with said at least one evaporator being in heat transfer association with both compartments.

7. A refrigeration appliance according to claim 6, including a fan for directing a stream of air over said evaporator and a controllable door between said fan and at least one of said compartments to control an amount of heat transfer that occurs between said evaporator and said at least one of said compartments.

8. A refrigeration appliance according to claim 1, including a fan for directing a stream of air over said evaporator.

9. A refrigeration appliance according to claim 8, wherein said control circuit is further arranged to control said evaporator fan in response to an input from said temperature sensor.

10. A refrigeration appliance according to claim 1, further comprising a memory device in communication with the control circuit and configured to store at least one parameter, the control circuit being configured to compare the input from the temperature sensor and the accumulation of time from the timing signal with the at least one parameter stored in the memory device.

11. A refrigeration appliance comprising
a first compartment to be cooled,
at least one evaporator in heat transfer association with said first compartment,
a defrost heater associated with said evaporator,
a temperature sensor associated with said evaporator,
a memory device configured to store at least one predetermined parameter,
a timer for providing a timing signal,
a control circuit arranged to
communicate with said memory device and said timer, to selectively energize said defrost heater during a defrost cycle,
selectively deenergize said defrost heater during said defrost cycle, and
said control circuit arranged to receive
an input from said temperature sensor,
an accumulation of time from said timing signal while said defrost heater is deenergized during said defrost cycle, and
said control circuit configured to compare the input from the temperature sensor and the accumulation of time from the timing signal with the at least one parameter stored in the memory device.

12. A refrigeration appliance according to claim 11, wherein the memory device stores at least on of the following parameters: a cut-off temperature, an optimum temperature, a designated deenergize time, an energize time, a designated drip time, an evaporator run time.

13. A refrigeration appliance according to claim 12, wherein the control device is configured to compare the input from the temperature sensor with the predetermined cut-off temperature stored in the memory device. evaporator run time.

14. A refrigeration appliance according to claim 12, wherein the control device is configured to compare the input from the temperature sensor with the predetermined optimum temperature stored in the memory device for determining whether to terminate the defrost cycle.

15. A refrigeration appliance according to claim 12, wherein the control device is configured to compare the accumulation of time from the timing signal with the designated deenergize time stored in the memory device.

16. A refrigeration appliance according to claim 11, wherein the control module is arranged to repeatedly energize and deenergize the defrost heater during the defrost cycle.

17. A refrigeration appliance according to claim 11, wherein said control circuit further is arranged to generate a second timing signal while said defrost heater is energized during said defrost cycle and to receive an accumulation of time from said second timing signal.

18. A refrigeration appliance according to claim 17, wherein said control circuit is further arranged to determine a drip time having a length dependent upon said accumulation of time from said second timing signal.

19. A refrigeration appliance according to claim 11 wherein said appliance further includes a second compartment to be cooled, with said at least one evaporator being in heat transfer association with both compartments, the appliance further comprising a fan for directing a stream of air over said evaporator and a controllable door between said fan and at least one of said compartments to control an amount of heat transfer that occurs between said evaporator and said at least one of said compartments.

20. A refrigeration appliance according to claim 11, including a fan for directing a stream of air over said evaporator, the control circuit being further arranged to control said evaporator fan in response to an input from said temperature sensor.

* * * * *